United States Patent [19]

Kämper

[11] Patent Number: 5,103,536
[45] Date of Patent: Apr. 14, 1992

[54] TENSIONING APPARATUS FOR A LASHING STRAP

[75] Inventor: Hans-Werner Kämper, Würselen, Fed. Rep. of Germany

[73] Assignee: Spanset Inter AG, Oetwil, Switzerland

[21] Appl. No.: 694,839

[22] Filed: May 2, 1991

[30] Foreign Application Priority Data

May 3, 1990 [DE] Fed. Rep. of Germany ....... 9005003
Mar. 8, 1991 [DE] Fed. Rep. of Germany ....... 9102777

[51] Int. Cl.$^5$ .......................................... B25B 25/00
[52] U.S. Cl. .................................. 24/68 CD; 24/68 R
[58] Field of Search ................. 24/68 CD, 68 R, 19, 24/71.2; 254/218; 294/74, 75

[56] References Cited

U.S. PATENT DOCUMENTS

| | | | |
|---|---|---|---|
| 4,199,182 | 4/1980 | Sunesson | 24/68 CD |
| 4,227,286 | 10/1980 | Holmberg. | |
| 4,570,305 | 2/1986 | Smetz et al. | |
| 4,584,742 | 4/1986 | Speich | 24/68 R |
| 4,622,721 | 11/1986 | Smetz et al. | 24/68 CD |

FOREIGN PATENT DOCUMENTS 8536678 12/1985 Fed. Rep. of Germany .
2105805 3/1983 United Kingdom .
2108616 5/1983 United Kingdom .

OTHER PUBLICATIONS

Lueger, "Lexikon Der Technik" (Encyclopedia of Technology), vol. 1 (1960), pp. 530-531.

Primary Examiner—Victor N. Sakran
Attorney, Agent, or Firm—Spencer, Frank & Schneider

[57] ABSTRACT

A tensioning assembly for the stepwise tightening and releasing of a tensioning strap includes a frame (1), a tensioning lever (2), and a wind-up spindle (4) supporting ratchet wheels (3, 3'). A driving pawl (19) which is movably mounted on the tensioning lever (2) serves to rotate the wind-up spindle (4) when the strap is being tightened. Reverse rotation of the wind-up spindle (4) is prevented by a pair of locking pawls (5, 5') which are movably mounted on the frame (1). The lower or bearing end of the tensioning lever (2) has an unlatching cam (37) which permits the locking pawls (5, 5') to be alternatingly moved out of engagement with the teeth of the ratchet wheels (3, 3'), thus promoting safety by relieving the strap tension in stages. An isolating cam (40) at the bearing end of the tensioning lever (2) permits both locking pawls (5, 5') to be disengaged after the strap tension has been reduced.

20 Claims, 7 Drawing Sheets

TENSIONING APPARATUS FOR A LASHING STRAP

CROSS REFERENCE TO RELATED APPLICATIONS

This application claims the priority of applications, Ser. No. G 90 05 003.7 and Ser. No. G 91 02 777.2, filed respectively on May 3rd, 1990 and Mar. 8th, 1991 in Germany, the subject matter of which is incorporated herein by reference.

BACKGROUND OF THE DISCLOSURE

The present invention relates to a tensioning apparatus for a lashing strap. Such an apparatus can be used to tighten the lashing strap in stages by way of a ratchet mechanism to impart a lashing tension as required, for example, to secure goods for transportation. The lashing straps may be provided in the form of textile lashing straps, chains, steel cables, ropes, etc.

German Patent No. 3,344,487, corresponding to U.S. Pat. No. 4,570,305, discloses a tensioning apparatus. The ratchet mechanism of this prior art tensioning apparatus is composed of a ratchet wheel equipped with directional teeth and two mutually parallel pawl slides mounted in a common guide slot. The two pawl slides are provided to reduce the locking jumps of the ratchet mechanism while retaining a relatively large tooth pitch angle as this is disclosed in Lueger, Lexikon der Technik [Encyclopedia of Technology], Volume 1, 1960, page 530.

Although the lashing tension in the prior art tensioning apparatus can be built up in small steps so that the lashing strap can be tightened to a high degree of tension, the lashing tension acting on the lashing strap is reduced very suddenly when the lashing strap is released. During transportation, shifts in the load may increase the tension even if it was high to begin with, so that a so-called "whiplash" effect may occur when the lashing strap is released. There is a comparatively high risk of injury due to the whiplash effect, which endangers the safety of the unloading crew entrusted with the handling of the goods being transported.

Another drawback of the prior art tensioning apparatus is that, upon release of the ratchet mechanism, the lashing strap no longer holds a slipped load so as to keep it standing solidly.

SUMMARY OF THE INVENTION

It is an object of the present invention to improve a tensioning apparatus of the above-mentioned type and to increase its reliability in use and its user friendliness.

This and other objects which will become apparent in the ensuing detailed description can be attained by providing a tensioning apparatus which comprises:
- a wind-up spindle for the tensioning strap rotationally mounted on a frame;
- a tensioning lever pivotally mounted on the wind-up spindle as the rotary drive;
- a releasable directional teeth ratchet mechanism for transferring the rotational driving force between th tensioning lever and the wind-up spindle; and
- a likewise releasable directional teeth ratchet mechanism between the frame and the wind-up spindle as a means to prevent reverse rotation during tensioning,
- wherein the wind-up spindle includes a ratchet wheel which rotates together with it for the directional teeth ratchet mechanism,
- wherein the tensioning lever supports a driving pawl which can be brought into engagement under resetting pressure with the ratchet wheel,
- wherein the frame supports two locking pawls which are offset in the circumferential direction and can be brought into engagement with the ratchet wheel under restoring pressure, and
- wherein the circumference of the bearing end of the tensioning lever is provided with a radial isolating cam serving to jointly move out the locking pawls, with the radial isolating cam charging the locking pawls in the tensioning direction by means of a pivoting movement of the tensioning lever,
the tensioning apparatus being characterized by the following features:
- the locking pawls are displaceable in separate frame guides at a distance from one another which is effective in the direction of rotation, and
- the radial isolating cam is adjacent to an unlatching cam for the selective removal of one of the two locking pawls.

An important feature of a tensioning apparatus according to the invention resides in providing two ratchet mechanisms that have directional teeth. A ratchet wheel provided with directional teeth and fixed to the wind-up spindle of the device serves as common locking member for both ratchet mechanisms. The driving ratchet mechanism, acting between the tensioning lever and the wind-up spindle, includes a driving pawl which is mounted in the tensioning lever so as to be longitudinally displaceable and which engages in teeth in the manner of a cam so as to rotate the wind-up spindle. The reverse rotation preventing ratchet mechanism is active between the frame and the wind-up spindle and includes two locking pawls as locking members. The locking pawls are mounted so as to be longitudinally displaceable in the frame and are arranged in an offset manner on the circumference of the ratchet wheel. The two locking pawls, which are mounted so as to be displaceable in different frame guide slots, are distributed about the circumference of the ratchet wheel in such a manner that the locking pawls are each alternatingly in engagement with the ratchet wheel. Thus, if one locking pawl is in engagement with the ratchet wheel, the other locking pawl is out of engagement.

The advantage of this locking pawl arrangement is—as in the prior art—that the lashing strap can be wound onto the wind-up spindle in small steps corresponding to one-half of a tooth pitch. The tensioning force required for each tensioning step is thus advantageously reduced.

The basic idea of the invention is that the lashing tension acting on the lashing strap should not only be built up in stages, but it should also be reduced in stages. The tensioning lever, which drives the wind-up spindle into rotation by way of the driving pawl, has its bearing end pivotally mounted at the wind-up spindle, and the bearing end is provided with an unlatching cam that radially projects from the periphery of the bearing end. For the step-wise reduction of the lashing tension in the lashing strap, the driving pawl can be withdrawn to an inactive position where it is out of engagement with the teeth, and then the tensioning lever can be pivoted away from the frame in the tensioning direction so that the unlocking cam moves a locking pawl out of the teeth and into an unlocked position. Alternating pivoting of the tensioning lever, once in the tensioning direction and then in the direction opposite to the tensioning direction, is used to deactivate both locking pawls alternatingly.

Due to the above-described back and forth movement of the tensioning lever, the lashing tension in the lashing strap is reduced in stages. If the material being moved has slipped during transportation and it is noted upon release of the lashing strap that the material no longer rests securely on the pallet or other transporting surface, it is merely necessary to re-activate the driving latch by moving it into the teeth in order to tighten the lashing strap again to secure the material. As soon as the material is again supported with the full lashing tension, it is possible to take the necessary measures to securely unload the slipped material without time pressure. The major advantage of the lashing apparatus of the invention is thus increased safety during release of the lashing strap for unloading the material from the transporting medium. A related advantage is the avoidance of the above-mentioned whiplash effect due to the iterative release of the tensioning ratchet.

Both the isolating cam and the unlatching cam are disposed on the periphery of the bearing end of the tensioning lever, with the unlatching cam being arranged to lead the isolating cam in the tensioning direction. The juxtaposition of the cams in this manner additionally improves manipulation of the tensioning apparatus. The tensioning lever initially rests on the frame. When the tensioning lever is then pivoted in the tensioning direction it moves, in a user friendly manner, first into a tensioning or locking region of the tensioning apparatus. After further pivoting in the tensioning direction, the lever reaches a release region in which the unlatching cam can be used to alternatingly move the locking pawls out of engagement with the teeth of the ratchet wheel. After the lashing tension has been reduced to such an extent that the lashing strap lies only loosely around the material being transported, the two locking pawls can be brought jointly out of engagement using the isolating cam by pivoting the tensioning lever further in the tensioning direction. The coil of lashing strap remaining on the wind-up spindle can then be easily unwound from the wind-up spindle by simply pulling on the lashing strap. The locking region, the release region, and the open or isolation position are located one behind the other, a placement which makes it easy to operate the tensioning apparatus.

The tensioning lever preferably includes a pair of side walls which are approximately parallel and which project in the manner of a fork from a handle member which is disposed parallel to the wind-up spindle, with a hollow box-like transverse connecting yoke which extends in the transverse direction and which is open in the direction toward the wind-up spindle being connected between the side members so as to bridge them. The driving pawl preferably lies in pawl guide slots provided in the tensioning lever side walls so as to be longitudinally displaceable and is preferably biased with spring pressure against the transverse connecting yoke, and a gripping bar is preferably connected to the driving pawl to permit the driving pawl to be longitudinal displaced in the direction toward the transverse connecting yoke.

Such a configuration of the tensioning lever and the elements mounted on it is favorable from a manufacturing point of view and is structurally simple. The handle member is provided at the end of the tensioning lever opposite the bearing end and serves, on one hand, as a bridging transverse connection between the side members of the tensioning lever and, on the other hand, as a handle for pivoting the tensioning lever. The open configuration of the tensioning lever advantageously reduces its weight.

The transverse connecting yoke bridges the side members of the tensioning lever and further stabilizes the structure of the tensioning lever. It also serves as a solid abutment for the spring biasing the driving pawl. The driving pawl can easily be moved out of engagement with the teeth of the ratchet wheel by means of its gripping bar. For this purpose, the handle member and the gripping bar are arranged in such a manner that, in order to withdraw the driving pawl from the teeth, the operator's hand is supported at the handle member and his index finger and ring finger pass through the gripping bar and move the driving pawl longitudinally by pulling in the direction toward the handle member.

The frame is preferably configured as a fork and has an approximately U-shaped cross section when seen in the transverse direction, with the legs of the U forming the frame side walls and with the button of the U constituting the bottom of the frame. A screw bolt preferably penetrates the frame side walls at one end of the frame for fastening the fixed end of the lashing strap, and the wind-up spindle is preferably mounted in bearing eyes in the frame side walls at the other end of the frame. Two ratchet wheels are preferably employed, the ratchet wheels being connected to the wind-up spindle in a form-locking manner and being located between the exterior faces of the frame side walls and the interior faces of the side members of the tensioning lever. The configuration is preferably symmetrical with respect to the center longitudinal axis of the frame.

The result is a structurally simple frame which is of advantage from the manufacturing aspect. The frame has a low weight in spite of its solidity. Due to the fork-like configuration of the frame, the fixed end of the tensioning strap can be easily attached to the frame and the wind-up spindle can be easily introduced into the frame. However, it is also possible to mount one end of the frame directly on a transporting means, for example on the bed of a truck.

Due to its symmetry, numerous identical parts can be employed, thus reducing the manufacturing costs for the tensioning apparatus. Moreover, the symmetrical configuration provides a symmetrical force distribution at the tensioning apparatus when the lashing tension is applied.

In its rest position, the tensioning lever preferably rests on the frame in the manner of a cover and, for rotationally driving the wind-up spindle in the tensioning direction, the tensioning lever can be pivoted into an 80° (for example) position relative to the frame. When it reaches the 80° position, the tensioning lever preferably hits against a tensioning stop abutment projecting radially from the periphery of the spindle end of the frame.

This measure prevents the tensioning lever from erroneously being moved from the tensioning or locking region into the release region by inadvertent excessive turning.

In order to further pivot the tensioning lever in the tensioning direction beyond the 80° position, the driving pawl can be lifted out of the teeth of the ratchet wheels, and in this out-of-engagement position, the contact with the tensioning stop abutment can be released. A convexly rounded release region pawl guide, which projects radially beyond the tip circle diameter of the ratchet wheels, is preferably provided behind th tensioning stop abutment to keep the driving pawl out of contact with the ratchet wheel when the tensioning lever is in the release region. The release region pawl guide is preferably delimited by abutments that project radially from the frame.

These features improve the user friendliness and operational safety of the tensioning apparatus. In order to release the lashing tension, the tensioning lever must merely be pivoted into the release region and moved back and forth between the delimiting stop abutments. Each time the driving pawl is halted by one of the two delimiting stop abutments, the wind-up spindle is turned back in the direction opposite to the tensioning direction by an amount corresponding to one-half of a tooth pitch. The step-wise release is thus easy and possible in a safe manner.

The locking pawls are preferably positioned so that they engage the teeth of the ratchet wheels at a distance corresponding to one-and-one-half tooth pitch from one another. Moreover the locking pawls are preferably aligned with one another like the legs of an acute angle whose vertex lies approximately on the axis of rotation of the wind-up spindle and are preferably mounted so as to be longitudinally displaceable in frame guide slots. The unlatching cam holds one of the locking pawls out of engagement with the teeth when the tensioning lever is moved to a first predetermined position which is established by the delimiting stop at one end of the release region pawl guide, and similarly the unlatching ca holds the other locking pawl out of engagement when the tensioning lever is moved to a second predetermined position which is established by the delimiting stop at the other end of the release region pawl guide. The lashing strap can be released in stages by alternatingly moving the tensioning lever back and forth between the first predetermined position and the second predetermined position.

These features further improve the operation of the tensioning apparatus. The locking pawls can easily be moved longitudinally between their extreme positions and are able to withstand great forces. The locking pawls can be easily mounted in the frame guide slots and constitute a robust and durable form locking connection with the frame.

In a second embodiment, the locking pawls can have a curved configuration to reduce the structural height of the tensioning apparatus. The tensioning apparatus of this embodiment can be harmoniously incorporated particularly in textile lashing straps. Moreover, due to its low structural height, the tensioning apparatus of the second embodiment requires less space for shipping and storage. Moreover, it does not project as far from the lashing strap, so that the risk of injury is reduced and thus the operational safety of the tensioning apparatus is increased.

BRIEF DESCRIPTION OF THE DRAWINGS

The invention will now be described in greater detail with reference to embodiments thereof that are illustrated in the drawing figures and include further features of significance for the invention.

DESCRIPTION OF THE PREFERRED EMBODIMENTS

Figure 1:
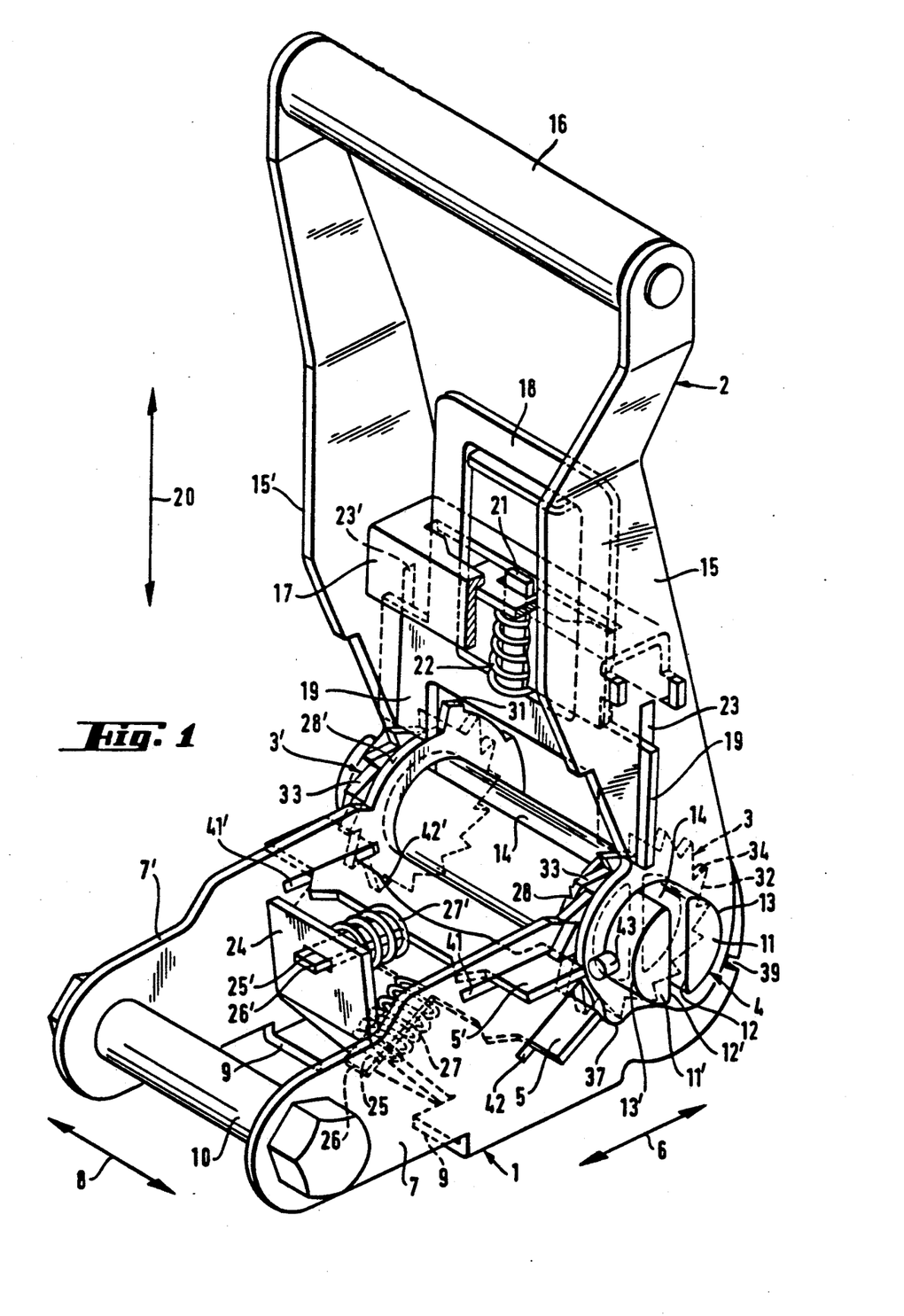
FIG. 1 is a perspective overall illustration of a tensioning apparatus according to first embodiment of the invention.
Figure 2:
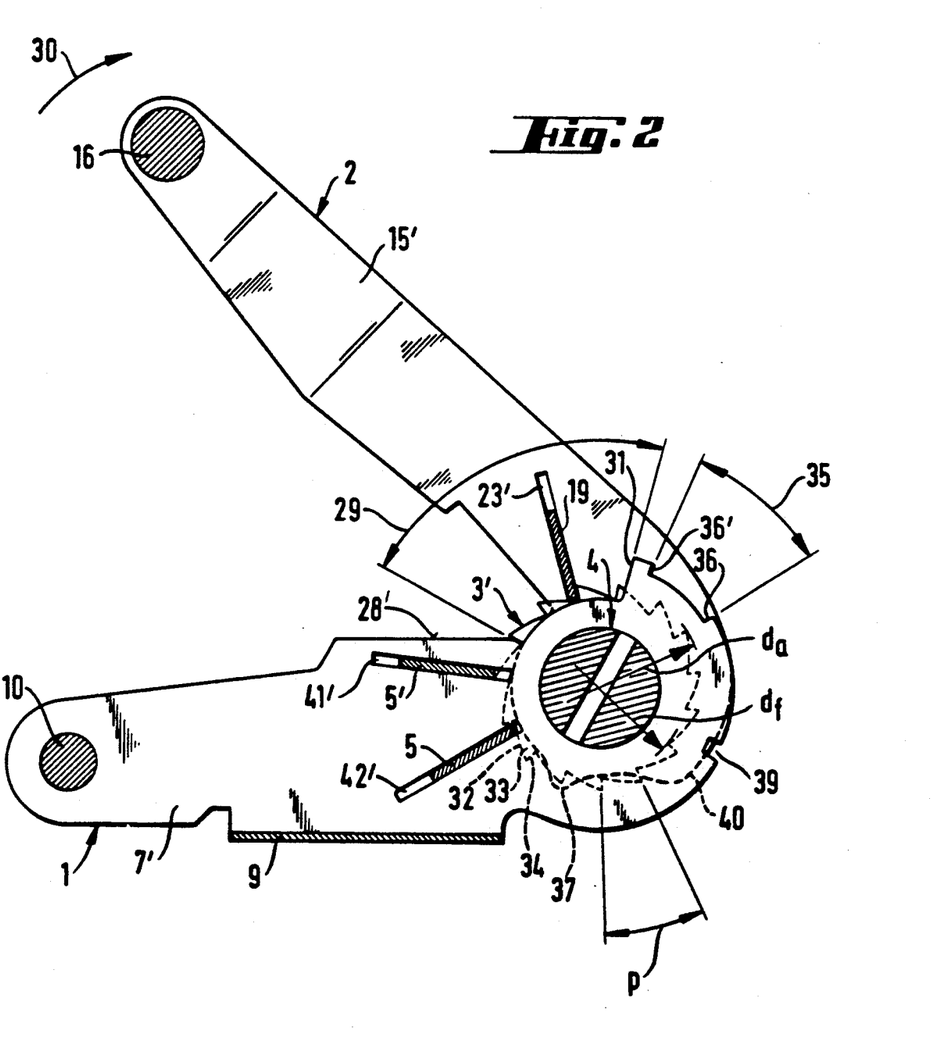
FIG. 2 is a basic sketch of the tensioning process.

With initial reference to FIGS. 1 and 2, a tensioning apparatus according to a first embodiment of the invention is essentially composed of a basic body in the form of a frame 1, a tensioning lever 2, two ratchet wheels 3 and 3', and a wind-up spindle 4 carrying the ratchet wheels. Ratchet wheels 3 and 3', together with two locking pawls 5 and 5' mounted at frame 1, form a reverse rotation preventing ratchet mechanism.

Frame 1 in turn is composed of two frame side walls 7 and 7' which extend in the longitudinal direction 6 and a frame bottom 9 which connects frame side walls 7 and 7' in a transverse direction 8, with transverse direction 8 extending at a right angle to longitudinal direction 6. Frame bottom 9 and frame side walls 7 and 7' have a U-shaped cross-sectional shape which extends in transverse direction 8. When viewed in longitudinal direction 6, frame side walls 7 and 7' project like a fork beyond frame bottom 9 at the free ends of frame 1.

At the free fastening end of frame 1, a screw bolt 10 penetrates frame side walls 7 and 7' in transverse direction 8. Screw bolt 10 serves to fasten the fixed end of a lashing strap which is not shown in the drawings and is preferably configured as a loop. At the free spindle end (28, 28') of frame 1, where it faces away from the free fastening end, the wind-up spindle 4 passes in transverse direction 8 through bearing eyes in the frame side walls 7 and 7'. Wind-up spindle 4 is composed of two half pins 11 and 11' which each have an essentially semicircular cross section. Each half pin 11 and 11' has a planar face 12 and 12', respectively, extending in transverse direction 8, as well as a rounded face 13 and 13', respectively, also extending in transverse direction 8. Half pins 11 and 11' are assembled so as to form wind-up spindle 4, with their planar faces 12 and 12' facing one another and their rounded faces 13 and 13' facing away from one another. Planar faces 12 and 12' do not contact one another but are spaced apart in such a way that a free space is formed between them which serves as an insertion slot 14.

Ratchet wheels 3 and 3' have teeth 33. Ratchet wheels 3 and 3' are each provided with recesses of semicircular cross section whose planar lines face one another and whose rounded lines face away from one another. These semicircular recesses approximately correspond in shape and in dimensions to the cross sections of half pins 11 and 11'. Half pins 11, 11' penetrate ratchet wheels 3 and 3' in these recesses in the manner of a movable fit. Ratchet wheels 3 and 3' are fixed to wind-up spindle 4 in such a manner that they are parallel to and flank the exterior side walls of frame 5 side walls 7 and 7', respectively.

Wind-up spindle 4 penetrates the fork-like bearing end of tensioning lever 2 in such a manner that ratchet wheels 3 and 3' are supported between the exterior faces of frame side walls 7 and 7' and the interior faces of tensioning lever side member 15 and 15'. Wind-up shaft 4 is secured against slipping in the transverse direction 8 by securing pins 43 that penetrates it in longitudinal direction 6 at the exterior faces of tensioning lever side members 15 and 15'. This also movably connects frame 1 with tensioning lever 2.

A handle member 16 which bridges tensioning lever side members 15 and 15' is fastened to the gripping or handle end of tensioning lever 2 opposite wind-up spindle 4. Approximately in the center between handle member 16 and wind-up spindle 4, when seen in the longitudinal direction 6, a transverse connecting yoke 17 extending in transverse direction 8 is fixed between tensioning lever side members 15 and 15'. The transverse connecting yoke 17 is penetrated, in the direction toward handle member 16, by a gripping bar 18 of a driving pawl 19. Driving pawl 19 extends in a gripping direction 20 defined by wind-up shaft 4 as one end point and handle member 16 as the other end point. In the direction toward handle member 16, the gripping direction 20, a centering pin 21 projects from driving pawl 19. Centering pin 21 is surrounded by a helical spring element, a coil spring 22. The spring force of coil spring 22 moves driving pawl 19 in gripping direction 20 toward wind-up spindle 4, with transverse connecting yoke 17 serving as an abutment for spring 22.

Driving pawl 19 penetrates tensioning lever side members 15 and 15' in transverse direction 8 through pawl guide slots 23 and 23', respectively, which extend in gripping direction 20. In this manner, driving pawl 19 is mounted in tensioning lever side members 15 and 15', so as to be longitudinally displaceable in gripping direction 20. Driving pawl 19 together with ratchet wheels 3 and 3' constitutes the ratchet drive for rotationally driving wind-up spindle 4 by means of tensioning lever 2.

A guide member 24 projects upward from frame bottom 9. In longitudinal direction 6, guide member 24 is penetrated by two bearing openings 25 and 25'. A pin-type extension 26 of locking pawl 5 extending approximately in longitudinal direction 6 lies in bearing opening 25; a pin-type extension 26' of locking pawl 5' lies in bearing opening 25'.

Locking pawls 5 and 5' form the legs of an acute angle whose vertex is approximately congruent with the axis of rotation of wind-up spindle 4. The distance between the inner ends of the two pawls corresponds to one-and-one-half times the tooth pitch p, as shown in FIG. 2. Locking pawls 5 and 5' penetrate frame side walls 7 and 7' in transverse direction 8 and are mounted so as to be displaceable in longitudinal direction 6 within frame guide slots 41, 41'/42, 42'. Frame guide slots 41, 41'/42, 42' are provided in frame side walls 7 and 7'.

Between guide member 24 and each one of the two locking pawls 5 and 5', there lies a respective compression spring element. For locking pawl 5 this is a coil spring element 27 which surrounds pin-type extension 26 in the manner of a helix and for locking pawl 5' it is a coil spring element 27' which surrounds the pin-type extension 26' in the manner of a helix. Guide member 24 serves as abutment for coil spring elements 27 and 27' in order to use their spring force to bias locking pawls 5 and 5' toward ratchet wheels 3 and 3', respectively.

As shown in FIG. 2, the peripheries of the free spindle ends 28 and 28' of frame side walls 7 and 7' have shapes that are subdivided several times. First, when viewed from locking pawls 5 and 5', there is a locking or tensioning region 29 which is shaped as an arc of a circle whose center coincides with the center of ratchet wheels 3 and 3' and of wind-up spindle 4. Locking region 29 extends about 80 arc degrees, or approximately a quarter of a circle. The radius of this quarter-circle locking region 29 at free spindle ends 28 and 28' corresponds to the root circle radius ($d_f$) of teeth 33 on ratchet wheels 3 and 3'. If tensioning lever 2 is moved by means of its handle member 16 away from frame 1 in tensioning direction 30, it takes on a position relative to frame 1 of approximately 80°, with driving pawl 19 encountering a tensioning stop abutment 31 when it reaches the end of the locking region 29. The movement of tensioning lever 2 in tensioning direction 30 turns wind-up spindle approximately a quarter of a revolution in tensioning direction 30. When driving pawl 19 encounters stop abutment 31, tensioning lever 2 must be moved back toward frame 1 in a return direction opposite to tensioning direction 30. This causes driving pawl 19 to slide over the leading edges 32 of teeth 33, which are rounded in the direction opposite to tensioning direction 30. At the same time, one of the two locking pawls 5 and 5' engages behind another tooth 33 at its flat rear edge 34, which extends essentially radially with respect to ratchet wheels 3 and 3'. If ratchet wheels 3 and 3' are rotated further in tensioning direction 30 by driving pawl 19, locking pawls 5 and 5' slide over the rounded leading edges 32 of teeth 33 and alternatingly engage behind trailing edges 34 of teeth 33 after every revolution by one-half of a tooth pitch p. For tensioning, tensioning lever 2 is used to move driving pawl 19 back and forth between frame 1 and tensioning stop abutment 31 until wind-up spindle 4 has performed enough revolutions that the lashing strap fixed in its insertion slot 14 is wound around it in several turns and has acquired the required lashing tension.

For the iterative release of the ratchet mechanism, tensioning lever 2 is first used to move driving pawl 19 against tensioning stop abutment 31 Gripping bar 18 is then used to pull driving pawl 19 in gripping direction 2 out of the teeth and into a position in which it can be moved beyond tensioning stop abutment 31. In addition to locking region 29, the peripheries of free spindle ends 28 and 28' include, in tensioning direction 30, a release region 35. As shown in FIG. 2, release region 35 is shaped as a circular arc whose radius is greater than the tip circle radius ($d_a$) of ratchet wheels 3 and 3'. Release region 35 is delimited by delimiting stop abutments 36 and 36'.

Figure 3:
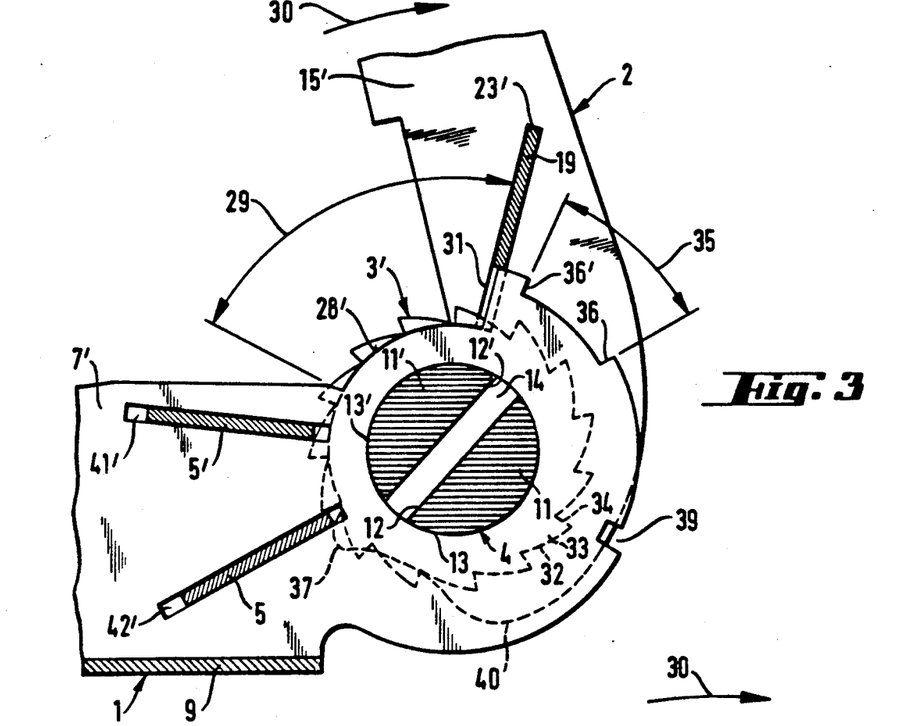
FIG. 3 is a basic sketch of the ratchet mechanism during its transition from the locking or tensioning region to the release region.
Figure 4:
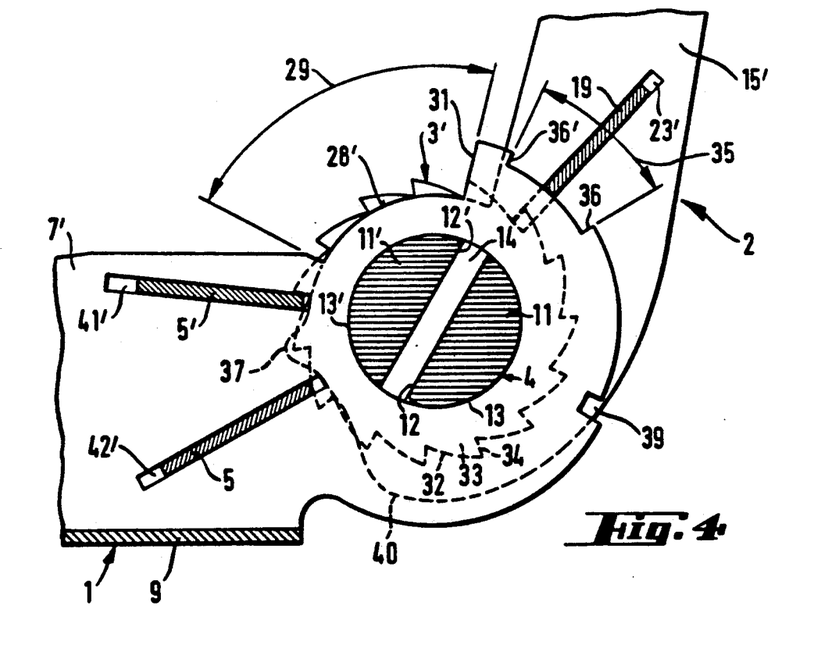
FIG. 4 is a basic sketch of the ratchet mechanism in the release region.
Figure 5:
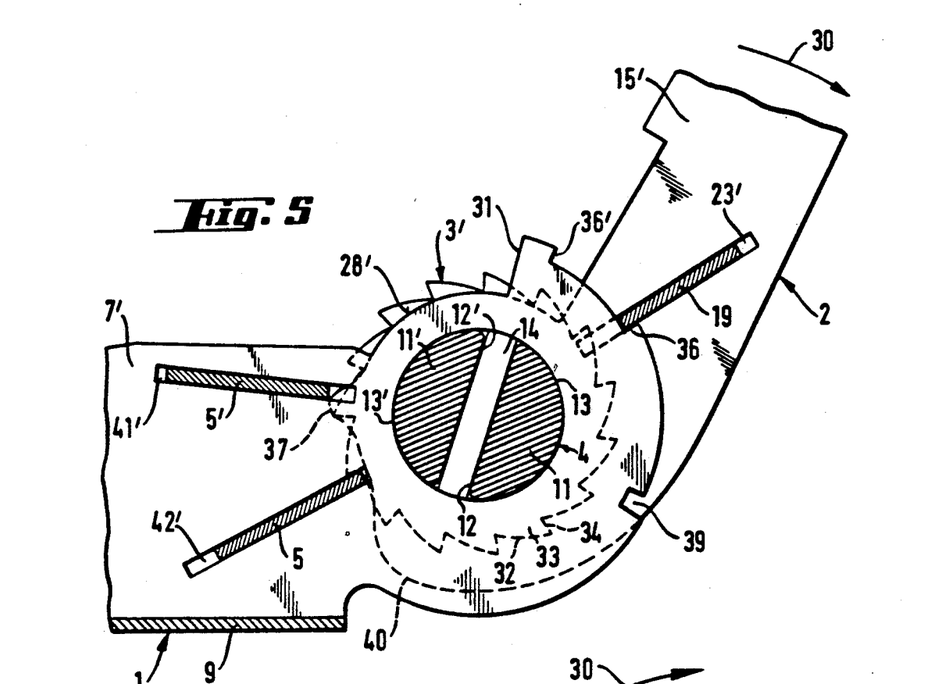
FIG. 5 is a basic sketch of the ratchet mechanism when the driving pawl is at one extreme position in the release region.

After driving pawl 19 has been lifted as shown in FIG. 3, tensioning lever 2 is moved further in tensioning direction 30. Coil spring 22 urges driving pawl 19 into release region 35 as shown in FIG. 4. The end of driving pawl 19 which faces away from gripping bar 18 lies against release region 35, which serves as a pawl guide. At the same time, an unlatching lobe or cam 37 at the periphery of the lower or bearing end of tensioning lever 2 comes in contact with locking pawls 5 and 5'. If, as shown in FIG. 5, driving pawl 19 lies against delimiting stop abutment 36, unlatching cam 37 lies against the end of locking pawl 5' in such a way that the latter is moved toward guide member 24 and out of engagement with teeth 33. This permits wind-up spindle 4 to rotate backwards (that is, in the direction opposite to tensioning direction 30) by a distance corresponding to one-half the tooth pitch p, until locking pawl 5 engages behind the trailing edge 34 of a tooth 33.

Figure 6:
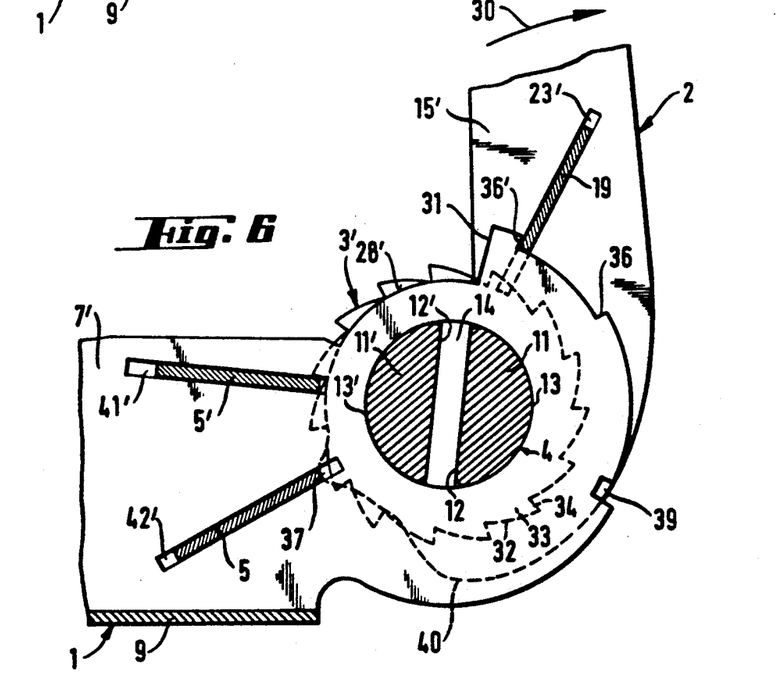
FIG. 6 is a basic sketch of the ratchet mechanism when the driving pawl is at the other extreme position in the release region.

If one then uses tensioning lever 2 to move driving pawl 19 against the second limiting stop abutment 36', as shown in FIG. 6, unlatching cam 37 comes to lie against the other locking pawl 5 in such a manner that the latter goes out of engagement with a tooth 33. Again wind-up spindle 4, driven by the strap tension, rotates backwards by one-half a tooth pitch until locking pawl 5' again engages behind the trailing edge 34 of a tooth 33.

Figure 7:
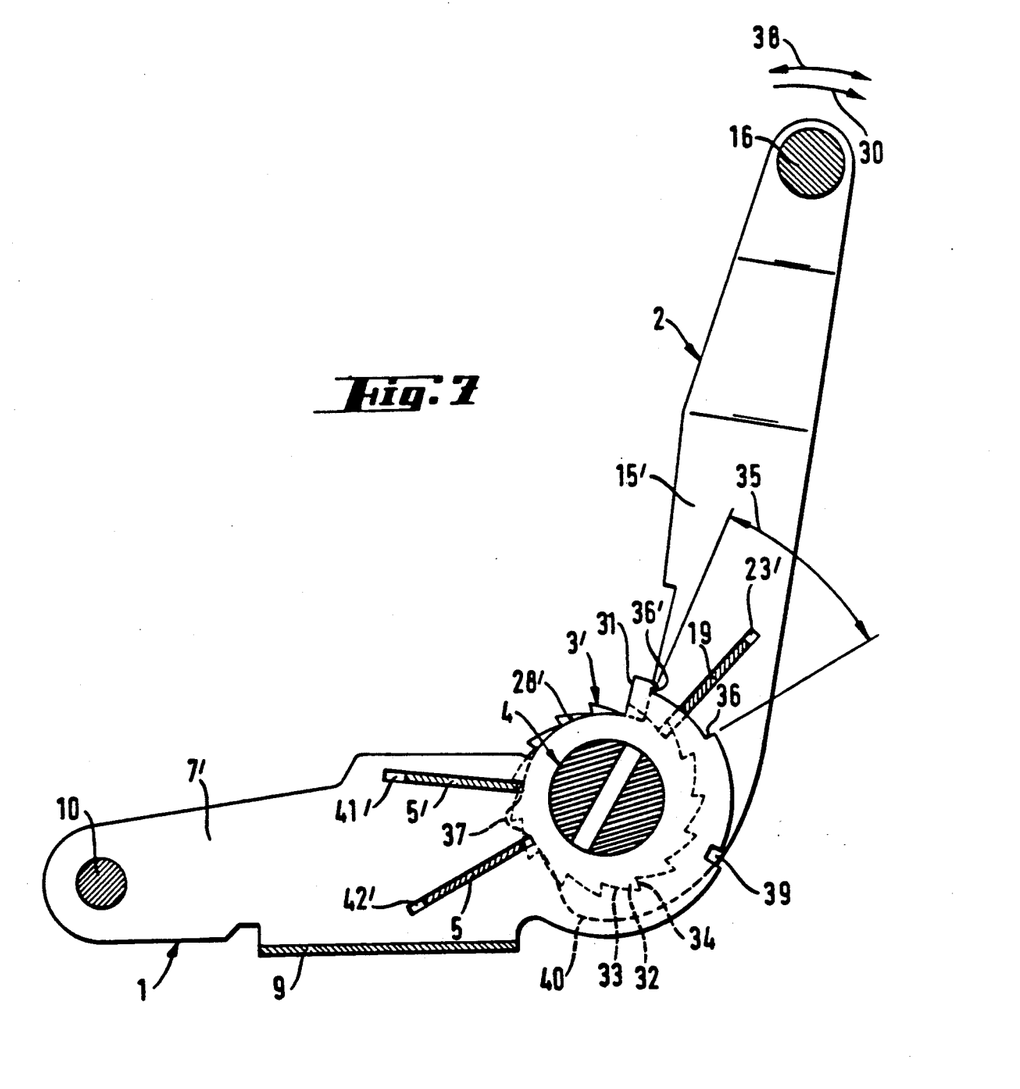
FIG. 7 is a basic sketch of the entire ratchet in a step-wise release position in the release region.
Figure 8:
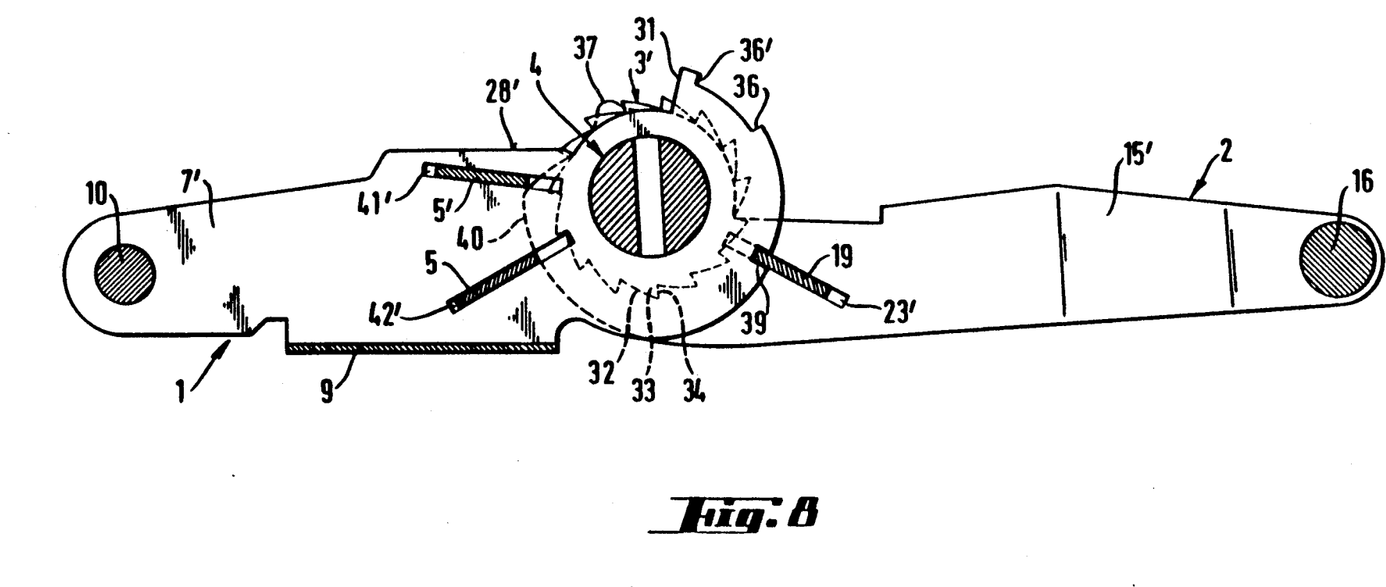
FIG. 8 is a basic sketch of the entire ratchet in the completely open position with an opening angle of 180° for the tensioning lever relative to the frame.

As indicated by the double arrow 38 in FIG. 7, the back and forth movement of tensioning lever 2, once in the tensioning direction 30 and once in the return direction opposite tensioning direction 30, and the alternating engagement of locking pawls 5 and 5' in teeth 33, releases the lashing tension in stages. As soon as it is possible to release the lashing strap from the material being transported without danger, driving pawl 19 and its gripping bar 18 are again moved in the direction toward handle member 16, and tensioning lever 2 is rotated in tensioning direction 30 until it reaches an angle of about 180° as shown in FIG. 8. A detent groove 39 is provided at the end of frame 1 by notches in the peripheries of free spindle ends 28 and 28'. Detent groove is located next to release region 35, when seen in tensioning direction 30. At the 180° open position shown in FIG. 8, driving pawl 19 engages in detent groove 39. In this open position, a radial isolating cam 40 at the peripheries of the bearing ends of tensioning lever side members 15 and 15' isolate both locking pawls 5 and 5' from ratchet wheels 3 and 3' by moving them out of engagement with teeth 33.

FIGS. 1 to 8 depict an embodiment of the tensioning apparatus in which the ratchet wheels 3 and 3' have a tooth pitch angle p of 24°, corresponding to a total of 15 teeth per ratchet wheel. In a further embodiment (not shown in the drawings), a tooth pitch angle p of 33°, which corresponds to a total of 11 teeth per ratchet wheel, can be used.

In principle any other tooth pitch angle p can also be employed. With a large tooth pitch angle p, unlatching cam 37 can have a relatively gentle slope, so that only a small force is needed to release locking pawls 5 and 5'. However, the distance between locking pawls 5 and 5' is increased and consequently the overall height of the tensioning apparatus increases.

In contrast thereto, if the tooth pitch angle p is small, unlatching cam 37 has a sharp, steep slope and a comparatively large force is required to release locking pawls 5 and 5'. At the same time the distance between the locking pawls 5 and 5' decreases to such an extent that the overall ratchet can be made very flat.

Figure 9:
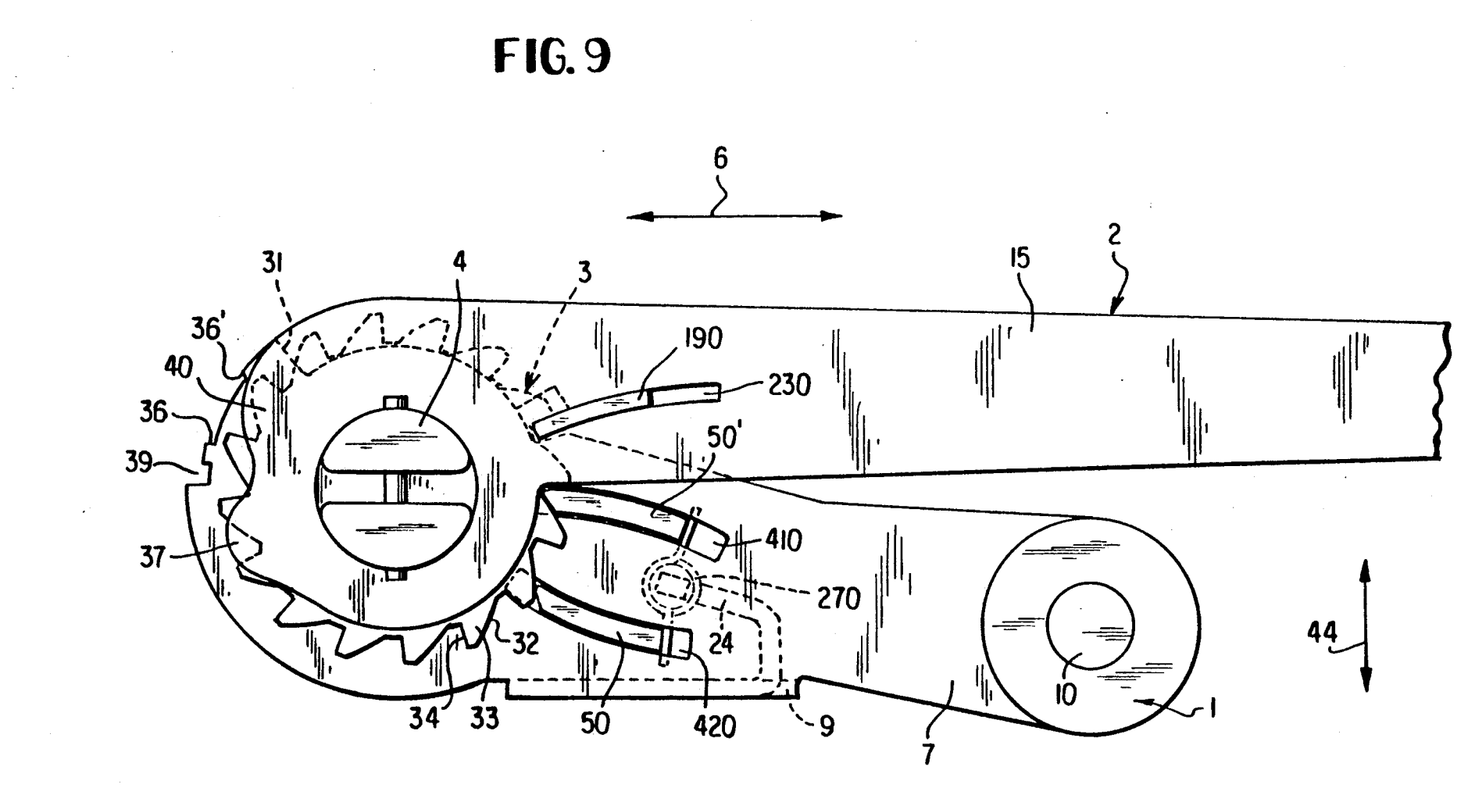
FIG. 9 is a side view of a second embodiment of the tensioning apparatus, which includes curved locking pawls.

In the special tensioning apparatus embodiment shown in FIG. 9, locking pawls 50 and 50' are curved. Driving pawl 190 is also curved analogously to locking pawl 50'. The locking pawls 50 and 50' are mounted in curved frame guide slots 410 and 420. The curved driving pawl 190 is also mounted in a curved pawl guide slot 230.

The ends of locking pawls 50 and 50' facing away from ratchet wheel 3 are each supported by a leg of a leg spring 270 arranged in transverse direction 8. In a space saving manner, leg spring 270 lies between the concave sides of the curved locking pawls 50 and 50'.

If locking pawls 50 and 50' are moved in their frame guide slots 410 and 420, which have the shape of ring segments, locking pawls 50 and 50' perform a pivoting movement which has a motion component in longitudinal direction 6 and a motion component in elevation direction 44. Elevation direction 44 is perpendicular to longitudinal direction 6 as well as to transverse direction 8. The curved locking pawls 50 and 50' are curved around their axes of curvature extending in transverse direction 8. The pivoting movement of the curved locking pawls 50 and 50' is a partial rotary movement about leg spring 270. The kinematics of the curved driving pawl 190 in curved pawl guide slot 230 are analogous to the movement of the curved locking pawls 50 and 50'. Consequently, this special embodiment provides a tensioning apparatus having a large tooth pitch p and an unlatching cam 37 which has a gentle slope without this tensioning assembly being very high structurally.

It will be understood that the above description of the present invention is susceptible to various modifications, changes, and adaptations, and the same are intended to be comprehended within the meaning and range of equivalents of the appended claims.

What is claimed is:

1. A tensioning apparatus for a lashing strap comprising:
   a wind-up spindle to receive the strap;
   a ratchet wheel connected to the wind-up spindle, the ratchet wheel having teeth;
   a first locking pawl;
   a second locking pawl;
   a frame on which the wind-up spindle is rotatably mounted, the frame having first guide means for movably supporting the first locking pawl s that the first locking pawl is positioned to engage the ratchet wheel, the frame additionally having second guide means for movably supporting the second locking pawl so that the second locking pawl is positioned to engage the ratchet wheel and is offset from the first locking pawl in the circumferential direction of the ratchet wheel, the second guide means being separate from the first guide means;
   means for biasing the first locking pawl toward the ratchet wheel;
   means for biasing the second locking pawl toward the ratchet wheel;
   a tensioning lever having a handle end and having a bearing end, the tensioning lever being pivotably mounted on the wind-up spindle adjacent the bearing end thereof, the handle end of the tensioning lever being manually movable in a tensioning direction and in a return direction that is opposite the tensioning direction, the bearing end of the tensioning lever having an unlatching cam which is configured to move the first locking pawl away from the ratchet wheel when the tensioning lever is in a first predetermined position and to move the second locking pawl away from the ratchet wheel when the tensioning lever is in a second predetermined position, the bearing end of the tensioning lever additionally having an isolating cam adjacent the unlatching cam, the isolating cam being configured to move both locking pawls away from the ratchet wheel when the tensioning lever is in a third predetermined position; and driving means for tensioning the strap during a tensioning operation by rotating the wind-up spindle when the handle of the tensioning lever is manually moved in the tensioning direction during the tensioning operation, the driving means including a driving pawl, means for movably mounting the driving pawl on the tensioning lever at a position to engage the ratchet wheel, and means for biasing the driving pawl toward the ratchet wheel, wherein the first and second locking pawls engage the ratchet wheel during the tensioning operation to prevent reverse rotation of the wind-up spindle when the handle end of the tensioning lever is manually moved in the return direction.

2. The tensioning apparatus of claim 1, wherein the bearing end of the tensioning lever has a periphery, the unlatching and isolating cams being provided at the periphery, and wherein the unlatching cam leads the isolating cam, so as to encounter the locking pawls before the isolating cam encounters the locking pawls when the tensioning lever is manually rotated in the tensioning direction.

3. The tensioning apparatus of claim 1, wherein the tensioning lever comprises a handle member at the handle end and a pair of approximately parallel side members connected to the handle member, the handle member being generally parallel to the wind-up spindle.

4. The tensioning lever of claim 3, wherein the means for movably mounting the driving pawl comprises a hollow box-like yoke which is connected between the side members, the yoke having an open side which is oriented toward the wind-up spindle.

5. The tensioning lever of claim 4, wherein the means for movably mounting the driving pawl further comprises guide slots in the side members, the driving pawl slidably extending into the guide slots, and wherein the means for biasing the driving pawl comprises a spring which presses against the yoke, and further comprising a gripper bar which is connected to the driving pawl and which is oriented toward the handle member, the gripper bar being manually displaceable to longitudinally displace the driving pawl toward the yoke.

6. The tensioning apparatus of claim 1, wherein the frame comprises a frame bottom and a pair of frame side walls which are connected to the frame bottom, the frame having a generally U-shaped cross section, with the frame bottom being at the bottom of the U and with the frame side walls being at the sides of the U.

7. The tensioning apparatus of claim 6, wherein the frame has first and second ends, the frame side walls having bearing eyes adjacent the second end of the frame and the wind-up spindle extending through the bearing eyes, and further comprising a bolt which extends through the frame side walls adjacent the first end of the frame for fastening a fixed end of the lashing strap to the frame.

8. The tensioning apparatus of claim 6, wherein the tensioning lever comprises a handle member at the handle end and a pair of approximately parallel side members connected to the handle member, wherein the ratchet wheel is connected to the wind-up spindle in a form-locking manner and is sandwiched between one of the frame side walls and one of the side members, and further comprising another ratchet wheel having teeth, the another ratchet wheel being connected to the wind-up spindle in a form-locking manner and being sandwiched between the other frame side wall and the other side member.

9. The tensioning apparatus of claim 8, wherein the frame has a center longitudinal axis, and wherein the side members, frame side walls, and ratchet wheels are symmetrical with respect to the center longitudinal axis.

10. The tensioning apparatus of claim 1, wherein the frame further comprises a tensioning stop abutment which is positioned to engage the driving pawl, wherein the tensioning lever has a rest position in which it rests against the frame in the manner of a cover, and wherein the tensioning lever is manually movable in the tensioning direction from the rest position to a position about 80° relative to the frame during the tensioning operation, the driving pawl engaging the tensioning stop abutment at the position about 80° relative to the frame.

11. The tensioning apparatus of claim 10, wherein the tensioning lever is at an angle greater than about 80° relative to the frame when the tensioning lever is in it first, second, or third predetermined position, and further comprising lifting means, including a gripper bar connected to the driving pawl for manually lifting the driving pawl over the tensioning stop abutment so that the tensioning lever can be moved further in the tensioning direction than the position about 80° relative to the frame, the lifting means additionally lifting the driving pawl from the ratchet wheel.

12. The tensioning apparatus of claim 11, wherein the frame further comprises a release region pawl guide adjacent the tensioning stop abutment to keep the driving pawl lifted from the ratchet wheel while the tensioning lever is being moved between its first and second predetermined positions, the release region pawl guide being arcuate and the driving pawl sliding on the release region pawl guide at a position spaced apart from the teeth of the ratchet wheel.

13. The tensioning apparatus of claim 12, wherein the frame further comprises stop abutments at the ends of the release region pawl guide.

14. The tensioning apparatus of claim 13, wherein the driving pawl lies against the stop abutment at one end of the release region pawl guide when the tensioning lever is in its first predetermined position, and against the stop abutment at the other end of the release region pawl guide when the tensioning lever is in its second predetermined position.

15. The tensioning apparatus of claim 14, wherein the lashing strap is released in stages when the tensioning lever is manually moved back and forth between its first and second predetermined positions.

16. The tensioning apparatus of claim 1, wherein the ratchet wheel has a predetermined tooth pitch, and wherein the locking pawls have ends that engage the teeth and that are spaced apart by a distance corresponding to about one and a half tooth pitches.

17. The tensioning apparatus of claim I, wherein the locking pawls are elongated and are disposed at an acute angle to one another, the acute angle having a vertex that lies approximately on the axis of the wind-up spindle.

18. The tensioning apparatus of claim 1, wherein the ratchet wheel has a predetermined tooth pitch, wherein the locking pawls have ends that engage the teeth and that are spaced apart by a distance corresponding to one and a half tooth pitches, and wherein the locking pawls are curved about respective axes of curvature that is parallel to the axis of the wind-up spindle.

19. The tensioning apparatus of claim 18, wherein the locking pawls and the driving pawl comprise annular segments, wherein the first and second guide means comprise arcuate slots in the frame for receiving the driving pawls, and wherein the means for movably mounting the driving pawl comprises arcuate slots in the tensioning lever for receiving the driving pawl.

20. The tensioning apparatus of claim 19, wherein the locking pawls having concave sides which face one another, and wherein the means for biasing the first locking pawl and the means for biasing the second locking pawl comprise a spring which is mounted on the frame and which has first and second legs, the first leg pressing against the first locking pawl and the second leg pressing against the second locking pawl.

* * * * *